US012576743B2

(12) United States Patent
Takegata et al.

(10) Patent No.: US 12,576,743 B2
(45) Date of Patent: Mar. 17, 2026

(54) CHARGER SELECTION SYSTEM, CHARGER SELECTION METHOD, AND CHARGER SELECTION PROGRAM

(71) Applicant: Panasonic Intellectual Property Management Co., Ltd., Kadoma (JP)

(72) Inventors: Masaaki Takegata, Osaka (JP); Makoto Hashimoto, Kyoto (JP); Takashi Iida, Hyogo (JP); Masaharu Amaike, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 137 days.

(21) Appl. No.: 18/561,837

(22) PCT Filed: Jan. 25, 2022

(86) PCT No.: PCT/JP2022/002623
§ 371 (c)(1),
(2) Date: Nov. 17, 2023

(87) PCT Pub. No.: WO2022/254777
PCT Pub. Date: Dec. 8, 2022

(65) Prior Publication Data
US 2024/0239225 A1 Jul. 18, 2024

(30) Foreign Application Priority Data

May 31, 2021 (JP) ................................. 2021-091803

(51) Int. Cl.
B60L 53/62 (2019.01)
B60L 53/66 (2019.01)
(Continued)

(52) U.S. Cl.
CPC ............... B60L 53/62 (2019.02); B60L 53/66 (2019.02); B60L 58/12 (2019.02);
(Continued)

(58) Field of Classification Search
CPC .......... B60L 53/62; B60L 53/66; B60L 58/12; B60L 2240/545; B60L 2240/547; G16Y 20/30; H01M 220/20
See application file for complete search history.

(56) References Cited

U.S. PATENT DOCUMENTS 11,323,984 B2 5/2022 Kim et al.
2013/0094442 A1 4/2013 Kim et al.
(Continued)

FOREIGN PATENT DOCUMENTS

JP 2008-253072 A 10/2008
JP 2014-532350 A 12/2014
(Continued)

OTHER PUBLICATIONS

International Search Report dated Mar. 8, 2022, issued in counterpart International Application No. PCT/JP2022/002623 (5 pages).

*Primary Examiner* — Adnan M Mirza
(74) *Attorney, Agent, or Firm* — WHDA, LLP

(57) ABSTRACT

A charge control map for chargers specifies the relationship between an upper limit current and charging conditions including at least one of the temperature of the chargers, the state of charge (SOC) of a secondary battery mounted in an electrically driven vehicle to be charged, the voltage of the secondary battery, and time. A charge control map for an electrically driven vehicle specifies the relationship between an upper limit current and charging conditions including at least one of the temperature of the secondary battery, the SOC of the secondary battery, the voltage of the secondary battery, and time. A charger selection unit (118) selects a charger used for charging any electrically driven vehicle of a plurality of electrically driven vehicles from among the plurality of chargers. The charger selection unit (118) selects
(Continued)

at least one charger that least limits the charging perfor-
mance of the electrically driven vehicle to be charged.

10 Claims, 9 Drawing Sheets

(51) Int. Cl.
B60L 58/12 (2019.01)
*G16Y 10/40* (2020.01)
*G16Y 20/30* (2020.01)
*H01M 10/44* (2006.01)
(52) U.S. Cl.
CPC ... *B60L 2240/545* (2013.01); *B60L 2240/547*
(2013.01); *G16Y 10/40* (2020.01); *G16Y 20/30*
(2020.01); *H01M 10/44* (2013.01); *H01M*
*2220/20* (2013.01)

(56) References Cited

U.S. PATENT DOCUMENTS

2020/0207232 A1*  7/2020  Niwa ..................... B60L 53/62
2022/0050143 A1*  2/2022  Maeda ................. G01R 31/382

FOREIGN PATENT DOCUMENTS

JP        2017-049023 A    3/2017
JP        2019-097340 A    6/2019
JP        2020-108244 A    7/2020

* cited by examiner

FIG. 5

| SOC[%] | UPPER LIMIT CURRENT [A] OF CHARGING PROFILE (CHARGER A + VEHICLE A) | | |
|---|---|---|---|
| 0–10 | 8 | 30 | 8 |
| 10–48 | 8 | 20 | 8 |
| 48–80 | 8 | 8 | 8 |
| 80– | 0 | 4 | 4 |

TEMPERATURE[°C]

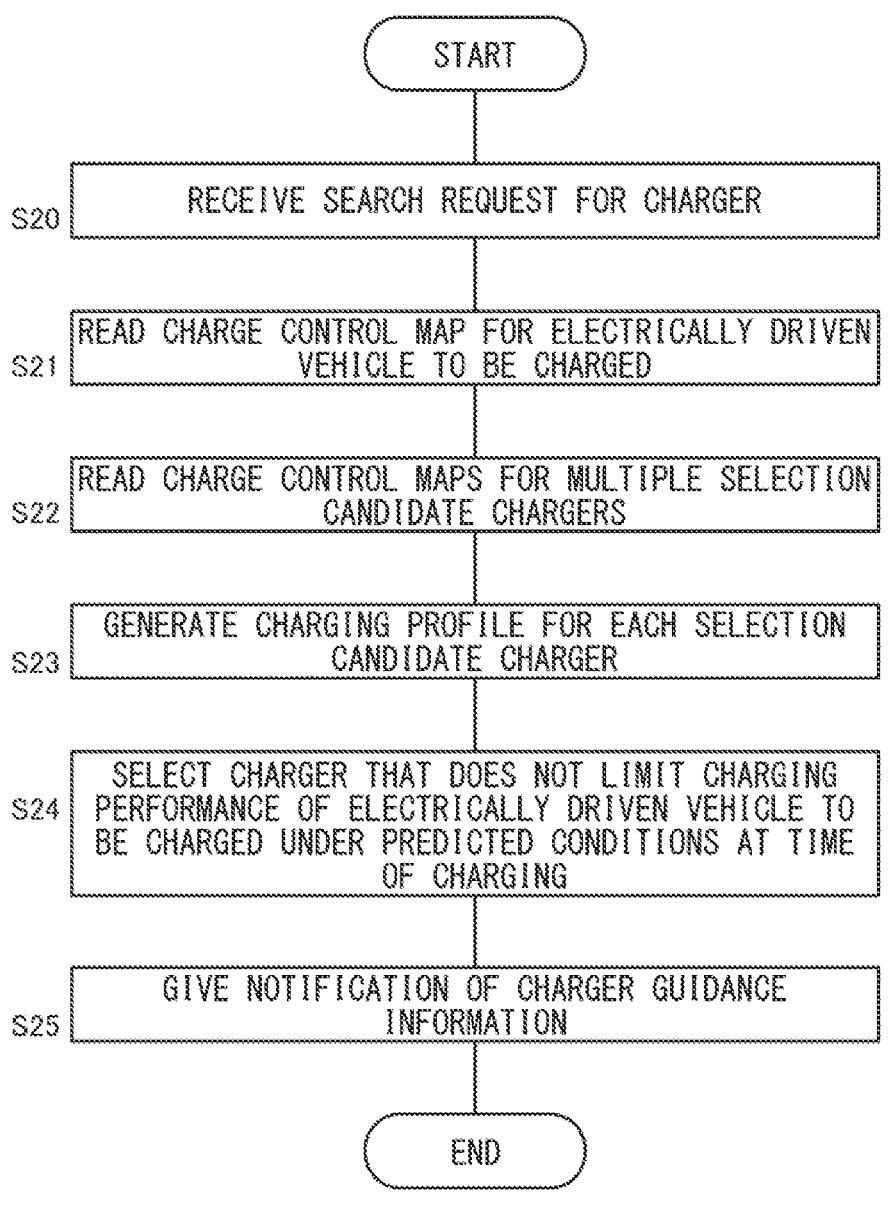

START

S20   RECEIVE SEARCH REQUEST FOR CHARGER

S21   READ CHARGE CONTROL MAP FOR ELECTRICALLY DRIVEN VEHICLE TO BE CHARGED

S22   READ CHARGE CONTROL MAPS FOR MULTIPLE SELECTION CANDIDATE CHARGERS

S23   GENERATE CHARGING PROFILE FOR EACH SELECTION CANDIDATE CHARGER

S24   SELECT CHARGER THAT DOES NOT LIMIT CHARGING PERFORMANCE OF ELECTRICALLY DRIVEN VEHICLE TO BE CHARGED UNDER PREDICTED CONDITIONS AT TIME OF CHARGING

S25   GIVE NOTIFICATION OF CHARGER GUIDANCE INFORMATION

END

CHARGER SELECTION SYSTEM, CHARGER SELECTION METHOD, AND CHARGER SELECTION PROGRAM

CROSS REFERENCE TO RELATED APPLICATIONS

This Application is the National Stage of International Application No. PCT/JP2022/002623, filed on Jan. 25, 2022, which claims priority from Application No. 2021-091803 filed on May 31, 2021 in Japan. The entire contents of these applications are incorporated herein by reference in their entirety.

TECHNICAL FIELD

The present disclosure relates to a charger selection system, a charger selection method, and a charger selection program that select a charger used for charging an electrically driven vehicle from among a plurality of chargers.

BACKGROUND ART

In recent years, the use of electrically driven vehicles such as electric vehicles (EV) and plug-in hybrid vehicles (PHV) has been growing. As the infrastructure development associated with this, the use of recharging facilities is also growing. With the evolution of compact mobility and the spread of car sharing, charging facilities are being used for a wide variety of electrically driven vehicles. The charging facilities are required to have high durability and complex control.

In order to charge a secondary battery mounted in an electrically driven vehicle as planned, it is necessary to charge the battery in a charging facility that meets the requirements of the vehicle. In this regard, a system has been suggested for matching an electric vehicle and a charging facility based on information on the electric vehicle and the power supply information on the charging facility (see, for example, Patent Literature 1).

[Patent Literature 1] JP 2014-532350 (published Japanese translation of PCT international publication for patent application)

SUMMARY OF INVENTION

Technical Problem

The charging performance including the upper limit charging current of a charging facility varies depending on the model and the time of introduction. The charging performance of an electrically driven vehicle also varies depending on the model and grade. In the case of charging at a charging facility with charging performance lower than that of an electrically driven vehicle, the charging performance of the electrically driven vehicle cannot be fully utilized.

In this background, a general purpose of the present disclosure is to provide a technology for appropriately selecting a charging facility to be used to charge a specific electrically driven vehicle from among a plurality of charging facilities.

Solution to Problem

A charger selection system according to one embodiment of the present disclosure includes: a first charge control map holding unit that holds a charge control map for a plurality of chargers; a second charge control map holding unit that holds a charge control map for a plurality of electrically driven vehicles; and a charger selection unit that selects a charger used for charging any one electrically driven vehicle of the plurality of electrically driven vehicles from among the plurality of chargers. A charge control map for a plurality of chargers specifies the relationship between an upper limit current and charging conditions including at least one of the temperature of the chargers, the SOC of a secondary battery mounted in an electrically driven vehicle to be charged, the voltage of the secondary battery, and time, a charge control map for the electrically driven vehicle specifies the relationship between an upper limit current and charging conditions including at least one of the temperature of the secondary battery, the SOC of the secondary battery, the voltage of the secondary battery, and time, and the charger selection unit selects at least one charger that least limits the charging performance of the electrically driven vehicle to be charged.

Optional combinations of the aforementioned constituting elements and implementations of the present disclosure in the form of apparatuses, methods, systems, computer programs, etc., may also be practiced as additional modes of the present disclosure.

Advantageous Effects of Invention

According to the present disclosure, a charging facility to be used to charge a specific electrically driven vehicle can be appropriately selected from among a plurality of charging facilities.

BRIEF DESCRIPTION OF DRAWINGS

FIG. 5 is a diagram showing a charging profile generated based on the charge control map for a charger A and the charge control map for an electrically driven vehicle A shown in FIGS. 4A-4B;

FIG. 7 is a flowchart showing an example of a recommended charger guidance process for the fastest charging;

DESCRIPTION OF EMBODIMENTS

Figure 1:
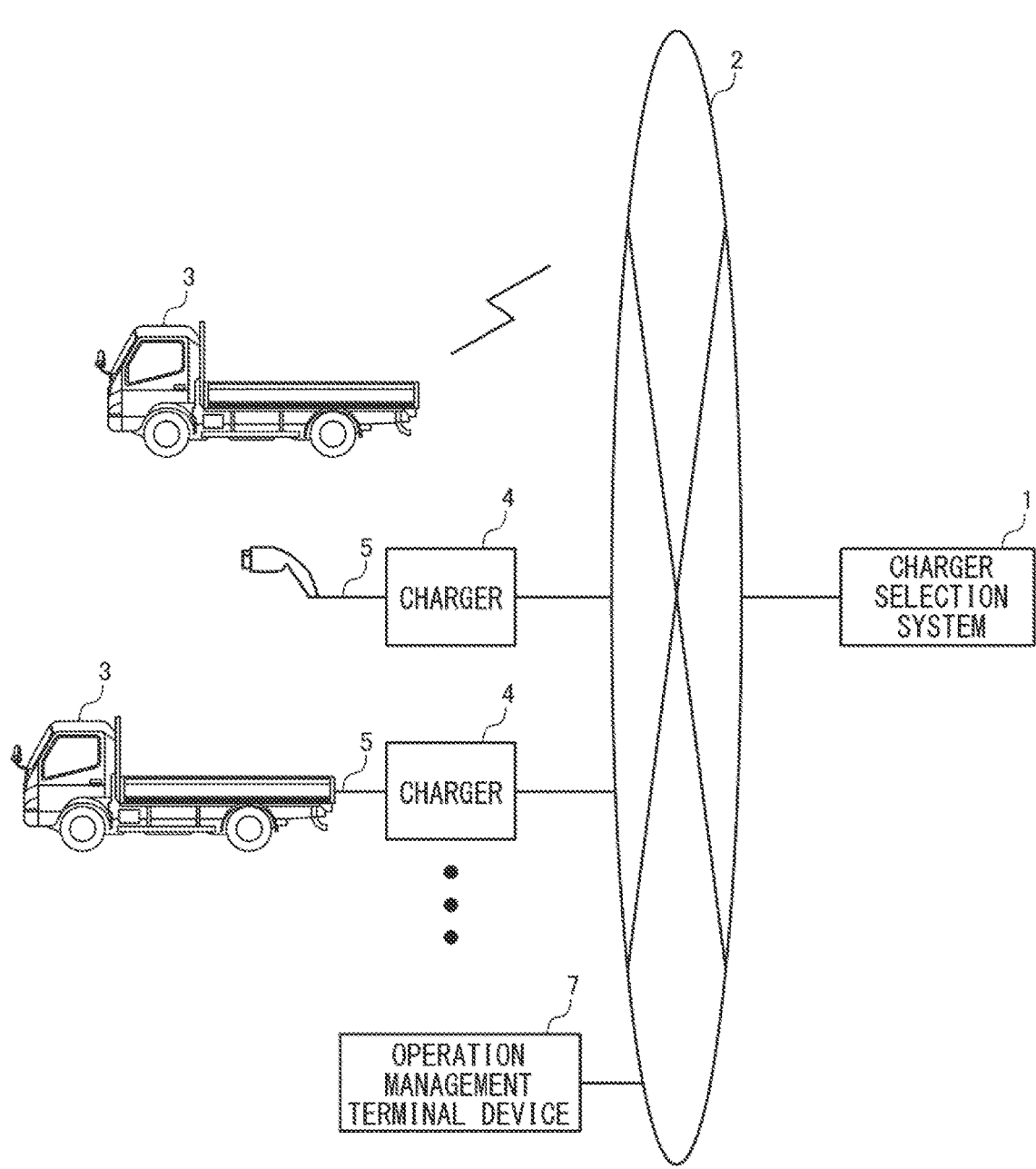
FIG. 1 is a diagram for explaining the outline of a charger selection system according to an embodiment.

FIG. 1 is a diagram for explaining the outline of a charger selection system 1 according to an embodiment. The charger selection system 1 according to the embodiment is a system suitable for use by a delivery operator. The charger selection system 1 may be constructed on an in-house server installed at a service provider's own facility or data center that provides operation management support services for an electrically driven vehicle 3, for example. Further, the charger selection system 1 may be constructed on a cloud server used based on a cloud service contract. Also, the charger selection system 1 may be constructed on a plurality of servers distributed and installed at a plurality of bases, which are data centers and own facilities. The plurality of servers may be any of a combination of a plurality of in-house servers, a combination of a plurality of cloud servers, or a combination of an in-house server and a cloud server.

Each delivery operator has a plurality of electrically driven vehicles 3, at least one charger 4, and a delivery base for parking the electrically driven vehicles 3. The electrically driven vehicles 3 are connected to the charger 4 through a charging cable 5, and secondary batteries mounted in the electrically driven vehicles 3 are charged from the charger 4 via the charging cable 5.

An operation management terminal device 7 is installed at the delivery base of the delivery operator. The operation management terminal device 7 consists of a PC, for example. The operation management terminal device 7 is used to manage the plurality of electrically driven vehicles 3 belonging to the delivery base. The operation manager of the delivery operator can use the operation management terminal device 7 so as to create delivery and charging plans for the electrically driven vehicles 3. The operation management terminal device 7 can access the charger selection system 1 via a network 2.

The network 2 is a general term for communication channels such as the Internet, a leased line, a virtual private network (VPN), etc., regardless of their communication media or protocols. As the communication media, for example, cellular phone networks (cellular networks), wireless LANs, wired LANs, optical fiber networks, ADSL networks, CATV networks, etc., can be used. For example, transmission control protocol (TCP)/internet protocol (IP), user datagram protocol (UDP)/IP, Ethernet (registered trademark), etc., can be used as the communication protocols.

The plurality of electrically driven vehicles 3 have a wireless communication function and can be connected to the network 2. The electrically driven vehicles 3 can transmit vehicle information to the charger selection system 1 via the network 2. A plurality of chargers 4 are connected to the network 2, and the chargers 4 can transmit charger information and charging logs to the charger selection system 1 via the network 2.

Figure 2:
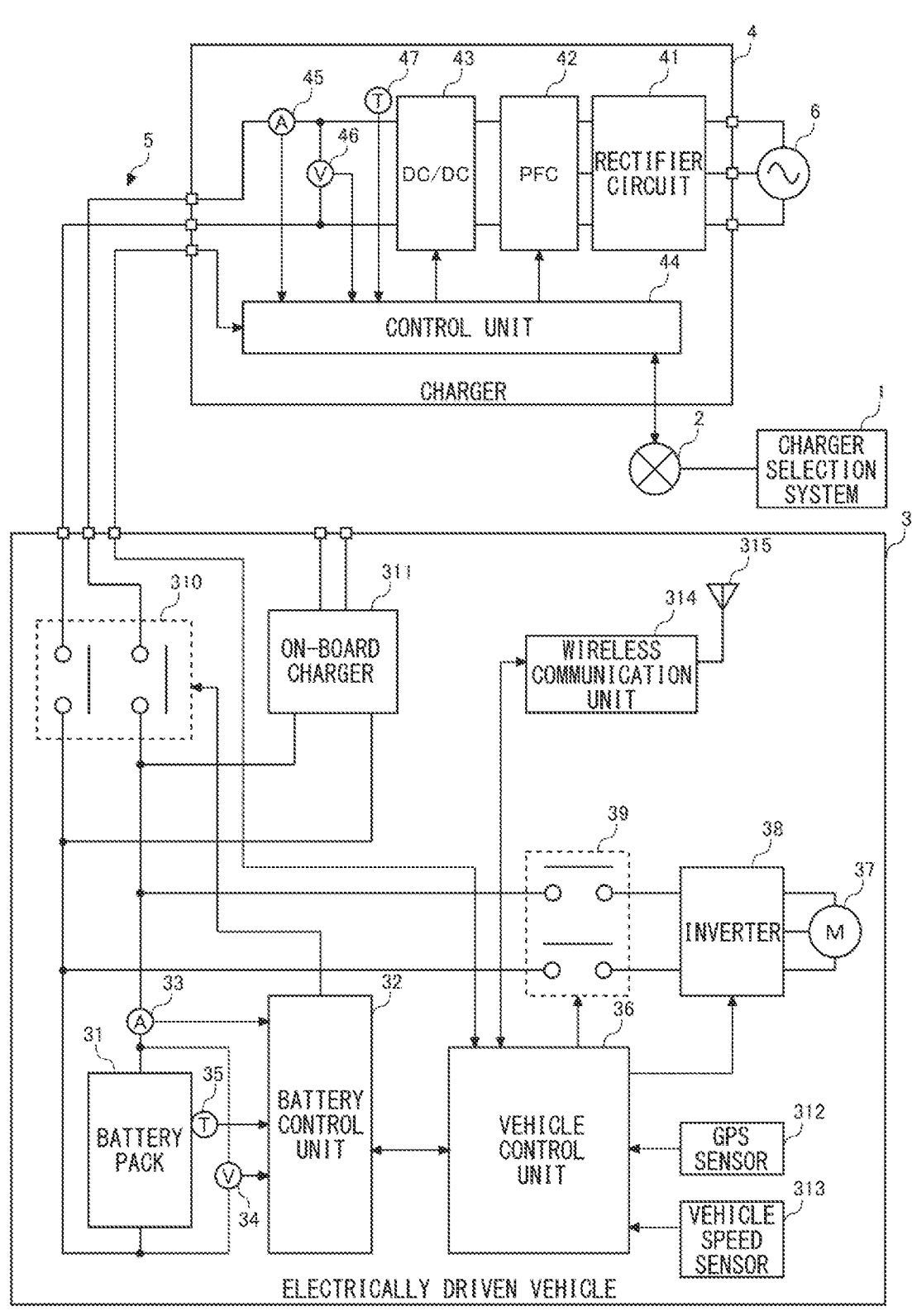
FIG. 2 is a diagram showing a configuration example of a charger and an electrically driven vehicle.

FIG. 2 is a diagram showing a configuration example of a charger 4 and an electrically driven vehicle 3. The charger 4 includes a rectifier circuit 41, a power factor correction (PFC) circuit 42, a DC/DC converter 43, a control unit 44, a current sensor 45, a voltage sensor 46, and a temperature sensor 47. In the embodiment, a quick charger compliant with CHAdeMO (registered trademark) is assumed.

The rectifier circuit 41 performs full-wave rectification of an AC voltage, for example, three-phase AC 200V, supplied from a commercial power system 6. The PFC circuit 42 improves the power factor of the full-wave rectified power. The DC/DC converter 43 is an isolated DC/DC converter and controls the current or voltage of DC power supplied from PFC circuit 42. The current sensor 45 detects the output current of the DC/DC converter 43 and outputs the output current to the control unit 44. The voltage sensor 46 detects the output voltage of the DC/DC converter 43 and outputs the output voltage to the control unit 44. The temperature sensor 47 detects the temperature inside the charger 4 and outputs the temperature to the control unit 44. The temperature sensor 47 may be installed outside the charger 4 so as to detect the outside temperature of the location where the charger 4 is installed and output the outside temperature to the control unit 44.

The control unit 44 controls the output current or output voltage of the DC/DC converter 43 based on the output current, the output voltage, or the temperature that is input. The control unit 44 includes a microcontroller, a communication controller, and a nonvolatile memory, e.g., an electrically erasable programmable read-only memory (EEPROM) and a flash memory.

A controller area network (CAN) is employed as the communication method between the charger 4 and the electrically driven vehicle 3 via the charging cable 5 in CHAdeMO and ChaoJi. Power line telecommunication (PLC) is employed in Combo. The charging cable 5 compliant with CHAdeMO includes a CAN communication line. The control unit 44 includes a CAN controller as a communication controller for controlling communication with the vehicle control unit 36 in the electrically driven vehicle 3.

The control unit 44 also includes a LAN controller as a communication controller for connecting to the network 2. The control unit 44 can transmit charger information to the charger selection system 1 via the network 2. The charger information can include a charger ID, a model, a network address, e.g., IP address, MAC address, installation location information, administrator information, etc.

The electrically driven vehicle 3 includes a battery pack 31, a battery control unit 32, a current sensor 33, a voltage sensor 34, a temperature sensor 35, a vehicle control unit 36, a motor 37, an inverter 38, a first relay 39, a second relay 310, an on-board charger 311, a GPS sensor 312, a vehicle speed sensor 313, a wireless communication unit 314, and an antenna 315.

The battery pack 31 includes a plurality of cells connected in series or in series-parallel. For the cells, lithium-ion battery cells, nickel hydrogen battery cells, lead battery cells, etc., can be used. Hereinafter, an example is assumed in the present specification where lithium-ion battery cells, with nominal voltage of 3.6-3.7 V, are used.

The current sensor 33 detects the current flowing in the battery pack 31 and outputs the current to the battery control unit 32. The voltage sensor 34 detects the voltage of battery pack 31 and outputs the voltage to battery control unit 32. Although not shown in the figure, the voltage sensor 34 can also detect the voltage of each of the plurality of cells connected in series that are included in the battery pack 31. The temperature sensor 35 detects the temperature of the battery pack 31 and outputs the temperature to the battery control unit 32. The temperature sensor 35 may be installed at multiple locations on the battery pack 31.

The battery control unit 32, also referred to as BMU or BMS, includes a microcontroller, a communication controller, and a nonvolatile memory. The battery control unit 32 and the vehicle control unit 36 are connected via an invehicle network, e.g., CAN or local interconnect network (LIN). The communication controller controls communication with the vehicle control unit 36.

The battery control unit 32 estimates the state of charge (SOC), the full charge capacity (FCC), and the state of health (SOH) of each of the plurality of cells included in the battery pack 31.

The battery control unit 32 combines the open circuit voltage (OCV) method and the current integration method so as to estimate the SOC. The OCV method is a method for estimating the SOC based on the OCV of the cell and the SOC-OCV curve of the cell. The SOC-OCV curve of a cell is created in advance based on a characteristic test performed by the battery manufacturer and is registered in the internal memory of the microcontroller at the time of shipment.

The current integration method is a method for estimating the SOC based on the OCV at the start of charging/discharging of a cell and the integrated value of the current flowing in the cell. In the current integration method, current measurement errors accumulate as the charging/discharging time becomes longer. Therefore, the SOC estimated according to the current integration method is preferably corrected using the SOC estimated according to the OCV method.

The battery control unit 32 can estimate the FCC by dividing the current integrated value from the start to the end of charging/discharging by the SOC change during that period. The SOC at the start and the SOC at the end of charging/discharging can be obtained from the measured OCV and SOC-OCV curve, respectively. SOH is defined by the ratio of the current FCC to the initial FCC, and the lower the value thereof (the closer to 0%), the more the deterioration is progressing.

The battery control unit 32 transmits the voltage, current, temperature, SOC, FCC, and SOH of the battery pack 31 and each cell to the vehicle control unit 36 via the in-vehicle network.

The vehicle control unit 36 is a vehicle electronic control unit (ECU) that controls the entire electrically driven vehicle 3 and may consist of, for example, an integrated vehicle control module (VCM). The vehicle control unit 36 includes a communication controller for connecting to the in-vehicle network and for communicating with the control unit 44 of the charger 4 via the charging cable 5, e.g., a CAN controller.

The electrically driven vehicle 3 includes a three-phase AC motor as a drive motor 37. The inverter 38 converts DC power supplied from the battery pack 31 into AC power and supplies the AC power to the motor 37 during power running. During regeneration, the inverter converts the AC power supplied from the motor 37 to DC power and supplies the DC power to the battery pack 31. The motor 37 rotates according to the AC power supplied from the inverter 38 during power running. During regeneration, the motor converts rotational energy caused due to deceleration to AC power and supplies the Ac power to the inverter 38.

The first relay 39 is a contactor that is inserted into wiring that connects the battery pack 31 and the inverter 38. The vehicle control unit 36 controls the first relay 39 to be in an ON state, a closed state, when the vehicle is running so as to electrically connect the battery pack 31 and the inverter 38. In principle, the vehicle control unit 36 controls the first relay 39 to be in an OFF state, an open state, when the vehicle is not running so as to electrically disconnect the battery pack 31 from the inverter 38.

The second relay 310 is a relay that is inserted into the DC wiring that connects the battery pack 31 and an inlet into which the charging cable 5 is inserted. The battery control unit 32 controls the second relay 310 to be in the ON state when charging from the charger 4 is being performed and controls the second relay 310 to be in the OFF state after the charging is completed.

The on-board charger 311 is used for charging with AC power by inserting a cable with an AC plug into a regular charger or a general-purpose AC outlet. The on-board charger 311 rectifies the AC voltage supplied via the cable with an AC plug in full wave, improves the power factor of the full-wave rectified power, and controls the current or voltage of the DC power with an improved power factor so as to supply to the battery pack 31.

The GPS sensor 312 detects the position information of the electrically driven vehicle 3 and transmits the detected position information to the vehicle control unit 36. The GPS sensor 312 specifically receives radio waves each including its transmission time from a plurality of GPS satellites and calculates the latitude and longitude of a reception point based on the plurality of transmission times respectively included in the received radio waves.

The vehicle speed sensor 313 generates a pulse signal proportional to the rotation speed of the axle and transmits the generated pulse signal to the vehicle control unit 36. The vehicle control unit 36 detects the speed of the electrically driven vehicle 3 based on the pulse signal received from the vehicle speed sensor 313.

The wireless communication unit 314 performs a signal process for wireless connection to the network 2 via the antenna 315. As wireless communication networks to which the electrically driven vehicle 3 can wirelessly connect, for example, cellular phone networks (cellular networks), wireless LAN, vehicle-to-infrastructure (V2I), vehicle-to-vehicle (V2V), electronic toll collection systems (ETC systems), and distance scanning resistance control (DSRC), etc., can be used.

The vehicle control unit 36 can transmit vehicle information from the wireless communication unit 314 to the charger selection system 1 via the network 2. The vehicle information can include vehicle ID, vehicle model, network address, e.g., IP address, MAC address, type and model number of the battery pack 31 mounted in the electrically driven vehicle 3, and the like.

In a state where the electrically driven vehicle 3 and the charger 4 are being connected by the charging cable 5, the vehicle control unit 36 can transmit the vehicle ID, the FCC and SOC of the battery pack 31, a charging current command value, and the like to the control unit 44 of the charger 4 via the CAN communication line in the charging cable 5.

The battery control unit 32 in the electrically driven vehicle 3 generates a charging current command value as control during charging. In the case of quick charging, the battery control unit 32 basically sets the upper limit current of the battery pack 31 as the charging current command value. The battery control unit 32 changes the upper limit current according to the conditions during charging from the viewpoint of ensuring safety during the charging and preventing deterioration of the battery pack 31. For example, the battery control unit 32 lowers the upper limit current as the SOC of the battery pack 31 increases. The battery control unit 32 also lowers the upper limit current as the temperature of the battery pack 31 becomes lower than or higher than the normal temperature. Hereafter, the relationship between the charging conditions during charging and the upper limit current value in the electrically driven vehicle 3 is referred to as a vehicle charge control map.

The battery control unit 32 transmits the generated charging current command value to the control unit 44 of the charger 4 via the vehicle control unit 36 and the charging cable 5. As basic control, the control unit 44 of the charger 4 controls the DC/DC converter 43 such that the output current of the DC/DC converter 43 becomes the charging current command value received from the battery control unit 32.

As control during the charging, the control unit 44 of the charger 4 limits the output current of the DC/DC converter 43 to be the upper limit current or less. The control unit 44 of the charger 4 changes the upper limit current according to the conditions during the charging from the viewpoint of ensuring safety during the charging. For example, the control unit 44 may lower the upper limit current as the temperature of the charger 4 increases. Further, the control unit 44 may lower the upper limit current as the SOC of the battery pack 31 being charged increases. Hereafter, the relationship between the charging conditions during the charging and the upper limit current value in the charger 4 is referred to as a charger charge control map.

The control unit 44 of the charger 4 limits the output current of the DC/DC converter 43 to the upper limit current set by the control unit 44 when the charging current command value received from the battery control unit 32 is higher than the upper limit current according to the conditions during charging.

The control unit 44 of the charger 4 transmits a charging log to the charger selection system 1 via the network 2 after the charging for the electrically driven vehicle 3 is completed. Prior to transmitting the charging log, the control unit 44 of the charger 4 receives from the vehicle control unit 36 the battery pack ID and transition data of the SOC, voltage, current, and temperature of the battery pack 31 being charged.

The charging log transmitted from the charger 4 to the charger selection system 1 can include the charger ID, the vehicle ID, the charging start time, the charging end time, the output current, output voltage, and temperature of the charger 4, the battery pack ID of the battery pack 31, transition data of the SOC, voltage, current, temperature, and charging current command value transmitted from the electrically driven vehicle 3 to the charger 4 of the battery pack 31, etc.

Figure 3:
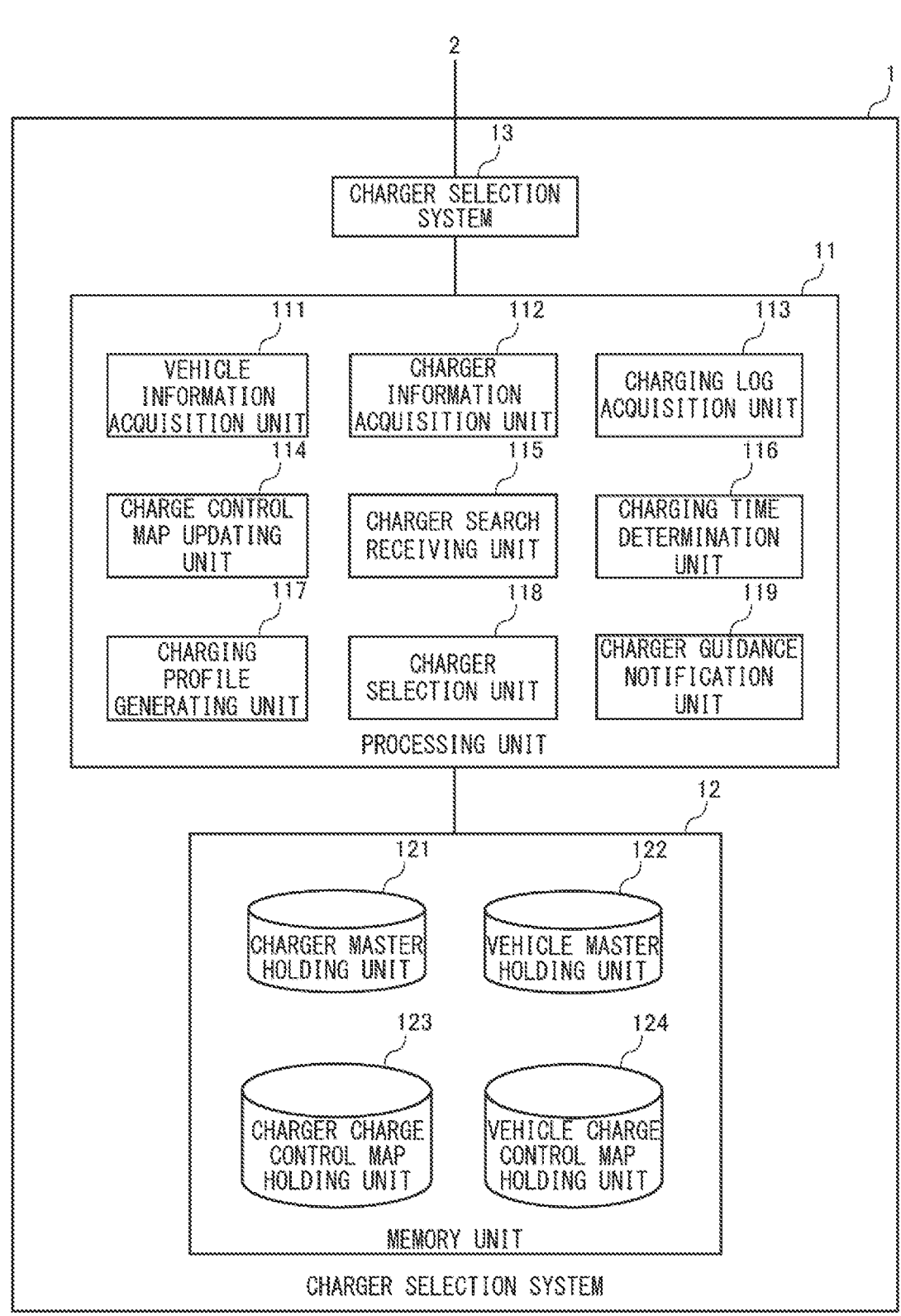
FIG. 3 is a diagram showing a configuration example of the charger selection system according to the embodiment.

FIG. 3 is a diagram showing a configuration example of the charger selection system 1 according to the embodiment. The charger selection system 1 includes a processing unit 11, a memory unit 12, and a communication unit 13. The communication unit 13 is a communication interface for connecting to the network 2 by wire or wirelessly.

The processing unit 11 includes a vehicle information acquisition unit 111, a charger information acquisition unit 112, a charging log acquisition unit 113, a charge control map update unit 114, a charger search receiving unit 115, a charging time determination unit 116, a charging profile generation unit 117, a charger selection unit 118, and a charger guidance notification unit 119.

The function of the processing unit 11 can be realized by cooperation of hardware resources and software resources, or only by hardware resources. As the hardware resources, CPU, ROM, RAM, graphics processing unit (GPU), application specific integrated circuit (ASIC), field programmable gate array (FPGA), and other LSIs can be used. Programs such as operating systems and applications can be used as the software resources.

The memory unit 12 includes a charger master holding unit 121, a vehicle master holding unit 122, a charger charge control map holding unit 123, and a vehicle charge control map holding unit 124. The memory unit 12 includes a non-volatile recording medium such as HDD, SSD, etc., and stores various types of data.

The charger master holding unit 121 holds master information of chargers 4 registered with a charger selection service. The chargers 4 registered with the charger selection service include chargers 4 installed at public charging stations. The master information of a charger 4 includes a charger ID, a model, a network address, an installation location, an administrator, a catalog specification, etc.

The vehicle master holding unit 122 holds master information of electrically driven vehicles 3 registered with the charger selection service. The master information of an electrically driven vehicle 3 includes a vehicle ID, a model, a network address, an administrator, the type of a battery pack 31 that is mounted, a model number, a catalog specification, etc.

The charger charge control map holding unit 123 holds charge control maps for a plurality of chargers 4 registered in the charger master holding unit 121. The charge control map of a charger 4 specifies an upper limit current according to the temperature of the charger 4, an upper limit current according to the SOC (or voltage) of the battery pack 31 to be charged, or an upper limit current according to a combination of the temperature of the charger 4 and the SOC (or voltage) of the battery pack 31 to be charged. Time can also be used as a charging condition during charge control. For example, as a countermeasure against rush current at the start of charging, a charger 4 may perform slow-start control such as performing charging at 10A or less for five minutes after the start of the charging. In this case, the upper limit current at the start of the charging is specified by time only or a combination of the time and the temperature.

The vehicle charge control map holding unit 124 holds charge control maps for a plurality of electrically driven vehicles 3 registered in the vehicle master holding unit 122. The charge control map of an electrically driven vehicle 3 specifies an upper limit current according to the temperature of the battery pack 31, an upper limit current according to the SOC (or voltage) of the battery pack 31 to be charged, or an upper limit current according to a combination of the temperature of the battery pack 31 and the SOC (or voltage) of the battery pack 31. Time can also be used as a charging condition during charge control.

Figure 4A:
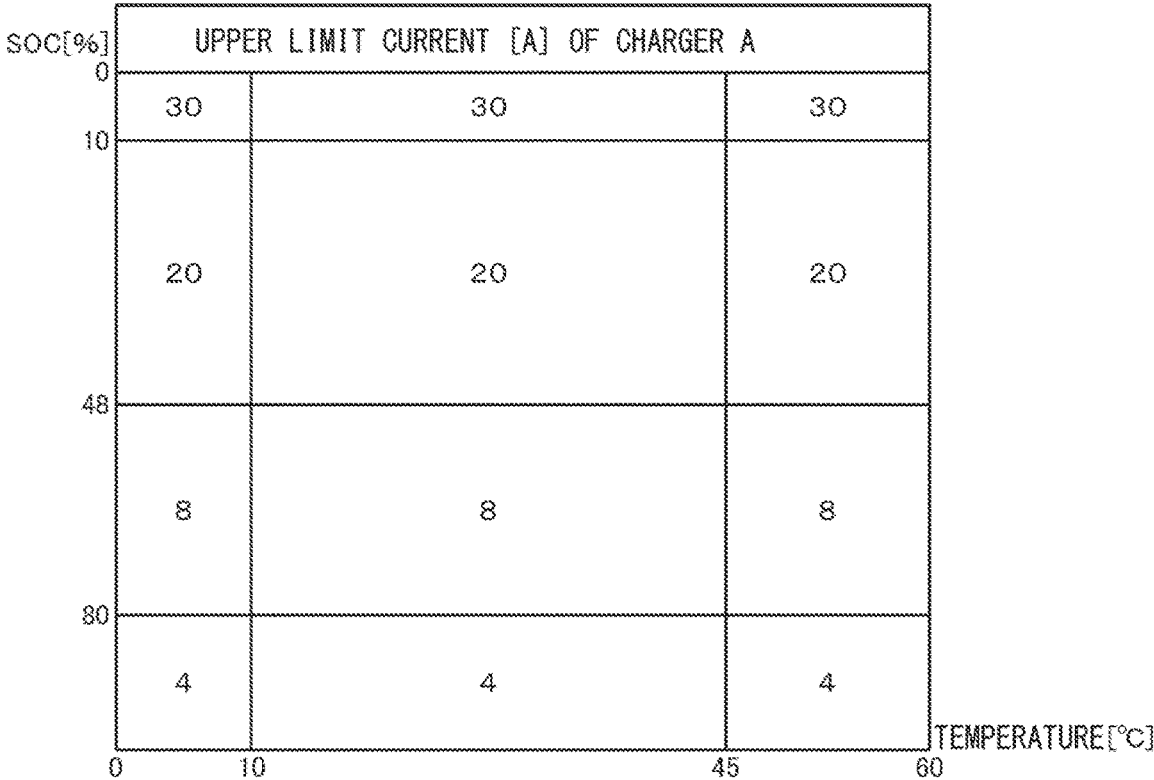
FIGS. 4A-4B are diagrams showing examples of a charge control map for a charger and a charge control map for an electrically driven vehicle.
Figure 4B:
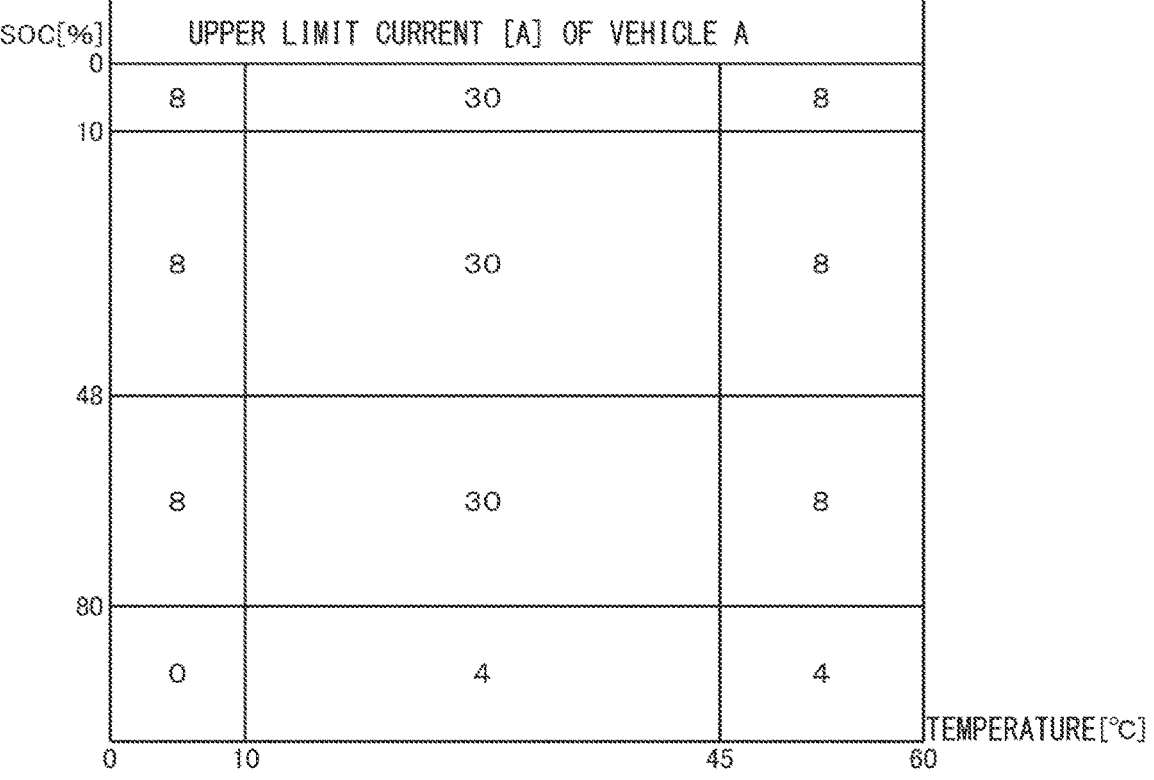

FIGS. 4A-4B are diagrams showing examples of a charge control map for a charger 4 and a charge control map for an electrically driven vehicle 3. FIG. 4A shows an example of a map that specifies the upper current limit in a charger A according to the combination of the temperature of the charger 4 and the SOC of the battery pack 31 to be charged. FIG. 4B shows an example of a map that specifies the upper current limit in an electrically driven vehicle A according to the combination of the temperature of the battery pack 31 and the SOC of the battery pack 31.

The charge control map for the charger 4 shown in FIG. 4A shows an example in which the upper limit current is changed according to the SOC of the battery pack 31 to be charged, without considering the temperature of the charger 4. The upper current limit may be changed according to the combination of the SOC of the battery pack 31 to be charged and the temperature of the charger 4. Alternatively, the upper limit current may be changed according to the temperature of the charger 4 without considering the SOC of the battery pack 31 to be charged.

In the case of a typical lithium-ion battery, the OCV is 2.9V at 0% SOC, 3.3V at 10% SOC, 3.7V at 48% SOC, 4.0V at 80% SOC, and 4.2V at 100% SOC. The battery control unit 32 can also estimate the SOC based on the OCV per cell obtained by dividing the OCV of the entire battery pack 31 by the number of series of lithium-ion battery cells in the battery pack 31.

The charge control map for the electrically driven vehicle 3 shown in FIG. 4B shows an example of changing the upper current limit according to the temperature and SOC of the battery pack 31. The voltage of the battery pack 31 may be used instead of the SOC of the battery pack 31. Alternatively, the upper current limit may be changed according to the temperature of the battery pack 31 without considering the SOC or voltage of the battery pack 31, or the upper current limit may be changed according to the SOC or voltage of the battery pack 31 without considering the temperature of the battery pack 31.

The initial values of the charge control map for the charger 4 are registered by the administrator of the charger selection system 1 based on the catalog specification of the charger 4. Items that cannot be read from the catalog specification of the charger 4 may be left blank or estimated values may be registered. In the same way, the initial values of the charge control map for the electrically driven vehicle 3 are registered by the administrator of the charger selection system 1 based on the catalog specification of the battery pack 31 mounted in the electrically driven vehicle 3.

The vehicle information acquisition unit 111 acquires vehicle information transmitted from the electrically driven vehicle 3 and registers the vehicle information in the vehicle master holding unit 122. The charger information acquisition unit 112 acquires charger information transmitted from the charger 4 and registers the charger information in the charger master holding unit 121.

The charging log acquisition unit 113 acquires the charging log transmitted from the charger 4. The charge control map updating unit 114 estimates the charge control performed by the battery control unit 32 of the electrically driven vehicle 3 based on the vehicle ID, transition data of the SOC, temperature, and charge current command value of the battery pack 31 included in the acquired charging log.

In general, as the battery pack 31 deteriorates over time, the internal resistance thereof increases while the capacity thereof decreases. When the internal resistance rises, the heat generation increases even when the same current is applied. Many battery manufacturers incorporate a control that lowers the upper limit current used for charge control performed by the battery control unit 32 according to the progress of deterioration over time of the battery pack 31.

The charge control map updating unit 114 reads the charge control map for the electrically driven vehicle 3 from the vehicle charge control map holding unit 124 based on the vehicle ID included in the acquired charging log. The charge control map updating unit 114 updates the read charge control map for the electrically driven vehicle 3 as necessary based on the estimated charge control of the electrically driven vehicle 3.

More specifically, the charge control map updating unit 114 compares the SOC, temperature, and charge current command value of the battery pack 31 included in the acquired charging log with the corresponding SOC, temperature, and upper limit current of the read charge control map, and updates the upper limit current to the charge current command if the charge current command value is lower than the upper limit current.

Further, the charge control map updating unit 114 estimates the charge control performed by the control unit 44 of the charger 4 based on the charger ID, the output current and temperature of the charger 4, and the transition data of the SOC and charge current command value of the battery pack 31 included in the acquired charging log.

In general, power elements used in the DC/DC converter 43 in the charger 4, e.g., metal-oxide semiconductor field-effect transmitters (MOSFETs) and insulated gate bipolar transistors (IGBTs), deteriorate over time. Due to deterioration over time, the conversion efficiency of the power elements decreases, and the heat generation increases. Further, other elements in the charger 4, e.g., electrolytic capacitors, coils, and fans, also deteriorate over time. Many charger manufacturers incorporate a control that decreases the upper current limit used for control during charging according to the progress of deterioration over time of the charger 4.

The charge control map updating unit 114 reads the charge control map for the charger 4 from the charger charge control map holding unit 123 based on the charger ID included in the acquired charging log. The charge control map updating unit 114 updates the read charge control map for the charger 4 as necessary based on the estimated charge control of the charger 4.

More specifically, the charge control map updating unit 114 compares the SOC of the battery pack 31 and the temperature and output current of the charger 4 with the corresponding SOC, temperature, and upper limit current of the read charge control map, and updates the upper limit current to the output current if the output current is lower than the upper limit current. The charge control map updating unit 114 does not update the upper limit current if the output current is lower than the upper limit current in order to satisfy the requirement of the charge current command value.

The charger search receiving unit 115 receives a search request for a charger 4 to be used for charging the electrically driven vehicle 3 via the network 2 from the electrically driven vehicle 3 or the operation management terminal device 7. The search request from the electrically driven vehicle 3 includes at least the vehicle ID. The search request may further include at least one of the following information: the current position information, latitude and longitude, of the electrically driven vehicle 3; a designated charging time, e.g., the shortest possible time, between XX o'clock and YY o'clock, or the like; a driving plan, e.g., a destination set in a car navigation system; and the SOC and target SOC for charging of the battery pack 31.

A search request from the operation management terminal device 7 also includes at least the vehicle ID. The search request may further include at least one of the following information: the current position information of the electrically driven vehicle 3; a designated charging time; a delivery plan; a charging plan, and the SOC and target SOC for charging of the battery pack 31.

The charging time determination unit 116 determines the charging time based on the received search request for the charger 4. If the search request includes a designated charging time, the charging time determination unit 116 determines the charging time to be this designated charging time. If the search request from the electrically driven vehicle 3 does not include a designated charging time, the charging time determination unit 116 determines the charging time to be the shortest. If the search request from the operation management terminal device 7 does not include a designated charging time or a charging plan but includes a delivery plan, the charging time determination unit 116 determines the charging time, charging start time and charging end time, based on the delivery plan.

If the charging time is set to the shortest by the charging time determination unit 116, the charger selection unit 118 selects a charger 4 that does not limit the charging performance of the electrically driven vehicle 3 to be charged from among a plurality of chargers 4 registered in the charger master holding unit 121. That is, the charger selection unit 118 selects a charger 4 having charging performance that encompasses the maximum charging performance of the electrically driven vehicle 3 to be charged.

If the current position information of the electrically driven vehicle 3 is included in the search request for the charger 4, the charger selection unit 118 may select only chargers 4 located within a predetermined distance from the current position of the electrically driven vehicle 3 from among the plurality of chargers 4 registered in the charger master holding unit 121 as selection candidates. For example, the charger selection unit 118 may set only chargers 4 located within a radius of X km centered on the current position of the electrically driven vehicle 3 as the selection candidates.

The charging profile generation unit 117 reads charge control maps for the selection candidate chargers 4 from the charger charge control map holding unit 123 and reads the charge control map for the electrically driven vehicle 3 to be charged from the vehicle charge control map holding unit 124. The charging profile generation unit 117 combines each of the charge control maps for the selection candidate chargers 4 and the charge control map for the electrically driven vehicle 3 to be charged so as to generate a charging profile for each selection candidate. More specifically, for each condition at the time of charging, the charging profile generation unit 117 plots the smaller of the upper limit current specified in the charge control map for a selection candidate charger 4 and the upper limit current specified in the charge control map for the electrically driven vehicle 3 to be charged.

FIG. 5 is a diagram showing a charging profile generated based on the charge control map for the charger A and the charge control map for the electrically driven vehicle A shown in FIGS. 4A-4B. For example, for a combination of the SOC in the range of 0 to 10% and the temperature in the range of 0 to 10° C., the upper current limit of the charger A is specified as 30 [A] and that of electric vehicle A as 8 [A]. In this case, the charging profile for the same conditions is 8 [A].

The charger selection unit 118 refers to the respective charging profiles for the selection candidates generated by the charging profile generation unit 117 so as to determine whether a charger 4 exists that does not limit the charging performance of the electrically driven vehicle 3 to be charged under all conditions at the time of charging. If there is, the charger selection unit 118 selects the charger 4 as a recommended charger. If there are some, the charger selection unit 118 selects those chargers 4 as recommended chargers. If the current position information of the electrically driven vehicle 3 is included in the search request for the charger 4, the charger selection unit 118 may prioritize the plurality of chargers 4 in order of proximity from the current position of the electrically driven vehicle 3.

If there is no charger 4 that does not limit the charging performance of the electrically driven vehicle 3 to be charged in all conditions at the time of charging, the charger selection unit 118 selects as the recommended charger the charger 4 with the fewest conditions at the time of charging that limit the charging performance of the electrically driven vehicle 3 to be charged.

If the SOC of the battery pack 31 mounted in the electrically driven vehicle 3 is included in the search request for the charger 4, the charger selection unit 118 may select a charger 4 that does not limit the charging performance of the electrically driven vehicle 3 based on the upper current limit of the SOC condition in the charging profile for each selection candidate. In that case, a charger 4 may be selected that allows for charging while both the charging performance of the charger 4 and the charging performance of the electrically driven vehicle 3 are at maximum performance.

The charger selection unit 118 may select a charger 4 that does not limit the charging performance of the electrically driven vehicle 3 based on the SOC and the upper limit current for the temperature condition in a charging profile for each selection candidate if atmospheric temperature information of areas where selection candidate chargers 4 are installed is acquired from a weather forecast server (not shown) via the network 2. In that case, a charger 4 may be selected that allows for charging while both the charging performance of the charger 4 and the charging performance of the electrically driven vehicle 3 are at maximum performance.

The charger guidance notification unit 119 notifies the electrically driven vehicle 3 or the operation management terminal device 7 that requested the search for the charger 4 of guidance information for a recommended charger selected by the charger selection unit 118. The guidance information for a recommended charger includes position information of the recommended charger.

The charger selection unit 118 selects as the recommended charger a charger 4 that can complete charging of the electrically driven vehicle 3 to a target SOC within a target charging time from among the plurality of registered chargers 4 if the current SOC and charging target SOC of the battery pack 31 are included in the search request of the charger 4 while the target charging time has been set by the charging time determination unit 116.

If the current SOC is not included in the search request for the charger 4, the charger selection unit 118 may assume that the current SOC is at 0%. If the search request for the charger 4 does not include a charging target SOC, the charger selection unit 118 may assume the charging target SOC to be at 100%.

If the current position information of the electrically driven vehicle 3 is included in the search request for the charger 4, the charger selection unit 118 may select only chargers 4 located within a predetermined distance from the current position of the electrically driven vehicle 3 from among the plurality of chargers 4 registered in the charger master holding unit 121 as selection candidates.

The charger selection unit 118 refers to the respective charging profiles for the selection candidates generated by the charging profile generation unit 117 so as to select as a recommended charger a charger 4 that can complete charging the electrically driven vehicle 3 to be charged to the target SOC within the target charging time. For example, in the case of a constant current charging profile, charging can be completed within the target charging time if the current rate obtained by dividing the capacity corresponding to the difference between the target charging SOC and the current SOC by the target charging time is equal to the upper limit current or less.

The charger selection unit 118 may select a charger 4 that can complete charging within the target charging time based on the upper limit current in an SOC range at the time of charging in a charging profile for each selection candidate. The charger selection unit 118 may select a charger 4 that can complete charging within the target charging time based on the upper limit current corresponding to the combination of an SOC range at the time of charging and an expected atmospheric temperature for each charging time zone in a charging profile for each selection candidate if expected atmospheric temperature information for each charging time zone of areas where selection candidate chargers 4 are installed is acquired from a weather forecast server (not shown).

If there are a plurality of chargers 4 that can complete charging within the target charging time, the charger selection unit 118 selects the plurality of chargers 4 as recommended chargers. If the current position information of the electrically driven vehicle 3 is included in the search request for the charger 4, the charger selection unit 118 may prioritize the plurality of chargers 4 in order of proximity from the current position of the electrically driven vehicle 3. Further, the charger selection unit 118 may prioritize the plurality of chargers 4 in descending order of upper limit current for the purpose of ensuring safety at the time of charging and suppressing deterioration of the battery pack 31.

If there is no charger 4 that can complete charging the electrically driven vehicle 3 to be charged within the target charging time, the charger selection unit 118 selects as a recommended charger the charger 4 that can bring the SOC of the battery pack 31 to be charged closest to the target SOC within the target charging time from among the selection candidate chargers 4.

The charger guidance notification unit 119 notifies the electrically driven vehicle 3 or the operation management terminal device 7 that requested the search for the charger 4 of guidance information for a recommended charger selected by the charger selection unit 118.

Figure 6:
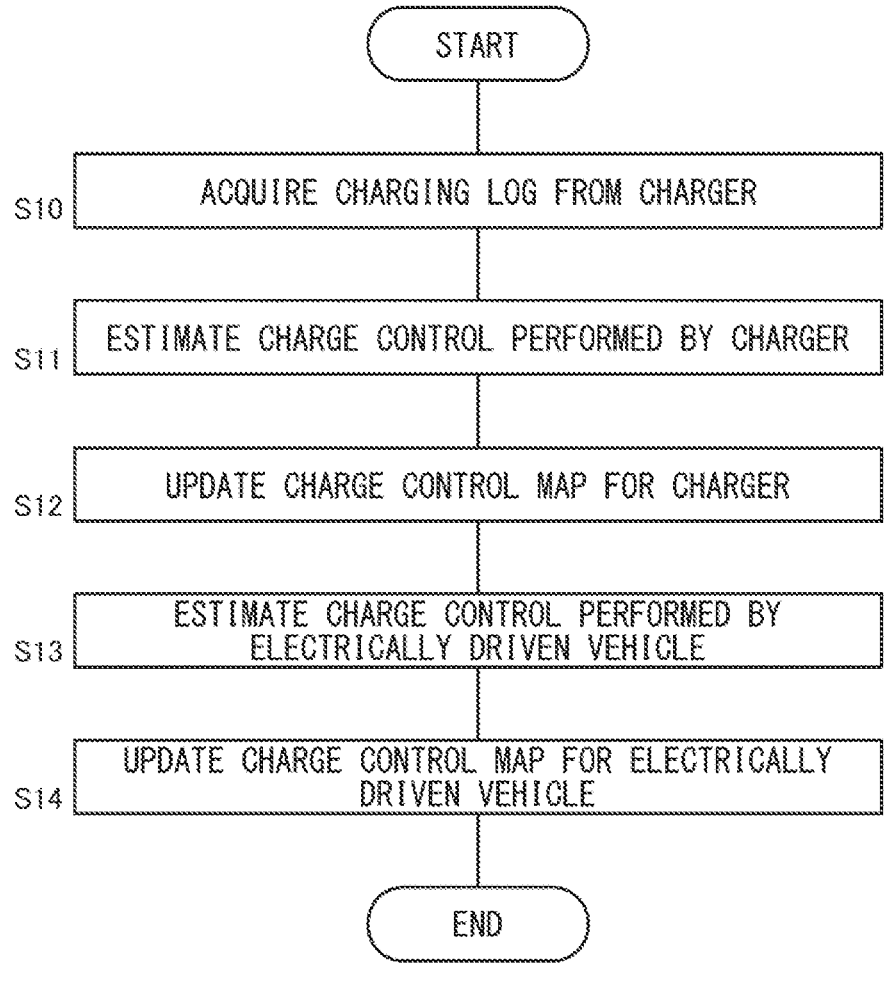
FIG. 6 is a flowchart showing an example of a process of updating the charge control map for the charger and the charge control map for the electrically driven vehicle.

FIG. 6 is a flowchart showing an example of a process of updating the charge control map for the charger 4 and the charge control map for the electrically driven vehicle 3. The charging log acquisition unit 113 acquires a charging log transmitted from the charger 4 that has finished charging the electrically driven vehicle 3 (S10). The charge control map updating unit 114 estimates charge control performed by the control unit 44 of the charger 4 from data contained in the acquired charging log (S11). The charge control map updating unit 114 updates as necessary the charge control map for the charger 4 read from the charger charge control map holding unit 123 based on the estimated charge control of the charger 4 (S12).

The charge control map updating unit 114 estimates charge control performed by the battery control unit 32 of the electrically driven vehicle 3 from data contained in the acquired charging log (S13). The charge control map updating unit 114 updates as necessary the charge control map for the electrically driven vehicle 3 read from the vehicle charge control map holding unit 124 based on the estimated charge control of the electrically driven vehicle 3 (S14).

FIG. 7 is a flowchart showing an example of a recommended charger guidance process for the fastest charging. The charger search receiving unit 115 receives a search request for a charger 4 to be used for charging the electrically driven vehicle 3 from the electrically driven vehicle 3 or the operation management terminal device 7 (S20). The charging profile generating unit 117 reads the charge control map for the electrically driven vehicle 3 to be charged from the vehicle charge control map holding unit 124 (S21). The charging profile generating unit 117 reads charge control maps for the plurality of selection candidate chargers 4 from the charger charge control map holding unit 123 (S22).

The charging profile generation unit 117 combines the charge control map for the electrically driven vehicle 3 to be charged and each of the charge control maps for the plurality of selection candidate chargers 4 so as to generate a charging profile for each selection candidate charger 4 (S23). The charger selection unit 118 refers to the respective charging profiles generated for the selection candidates and selects a charger 4 that does not limit the charging performance of the electrically driven vehicle 3 to be charged under predicted conditions at the time of charging as a recommended charger (S24). The charger guidance notification unit 119 notifies the electrically driven vehicle 3 or the operation management terminal device 7 that requested the search of guidance information for the selected recommended charger (S25).

Figure 8:
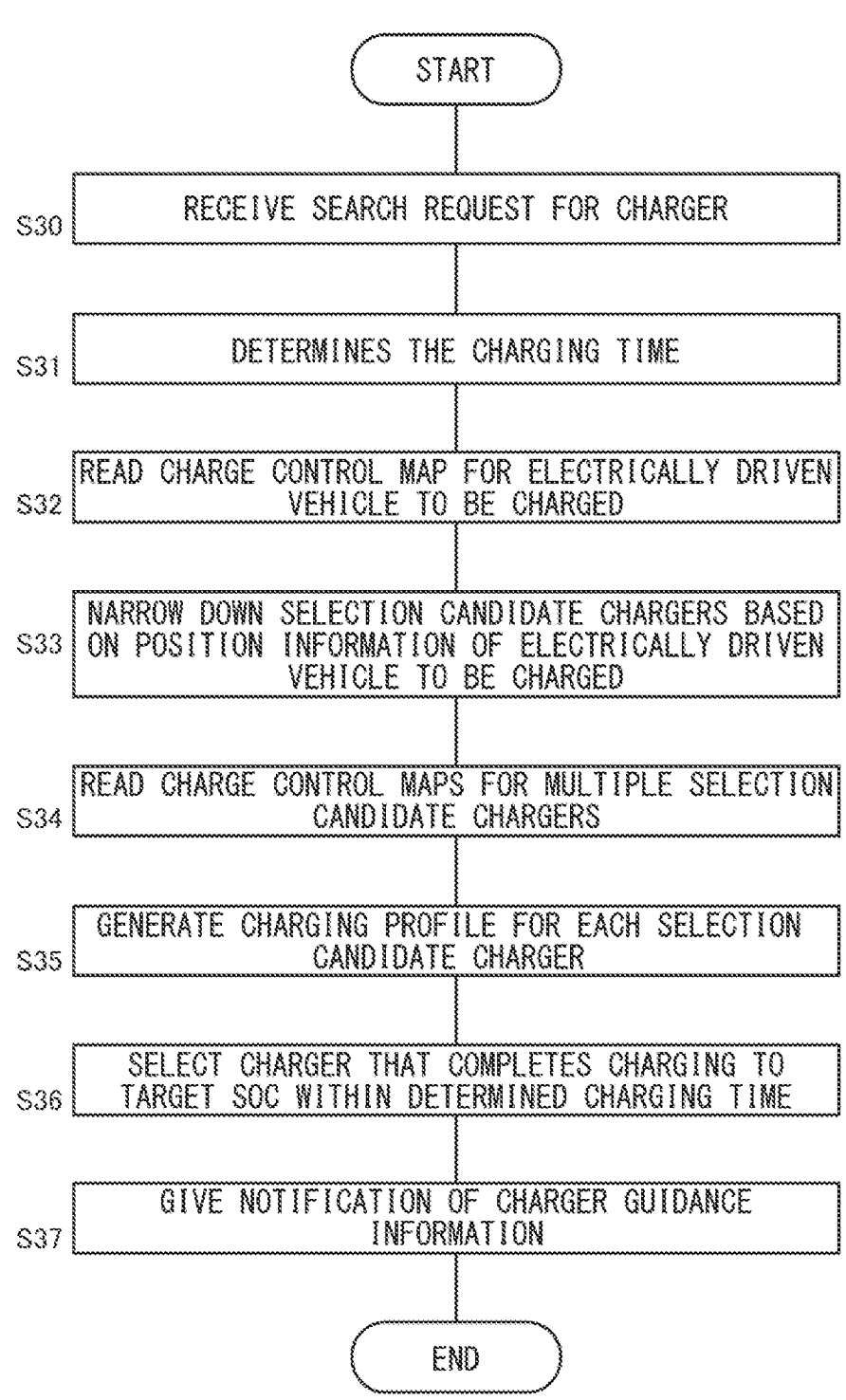
FIG. 8 is a flowchart showing an example of a recommended charger guidance process for non-fastest charging.

FIG. 8 is a flowchart showing an example of a recommended charger guidance process for non-fastest charging. The charger search receiving unit 115 receives a search request for a charger 4 to be used for charging the electrically driven vehicle 3 from the electrically driven vehicle 3 or the operation management terminal device 7 (S30). The charging time determination unit 116 determines the charging time based on various types of information included in the received search request for the charger 4 (S31).

The charging profile generating unit 117 reads the charge control map for the electrically driven vehicle 3 to be charged from the vehicle charge control map holding unit 124 (S32). The charger selection unit 118 narrows down the selection candidates from among the plurality of chargers 4 registered in the charger master holding unit 121 to chargers 4 located within a predetermined distance from the current position of the electrically driven vehicle 3 (S33). The charging profile generating unit 117 reads charge control maps for the plurality of selection candidate chargers 4 from the charger charge control map holding unit 123 (S34).

The charging profile generation unit 117 combines the charge control map for the electrically driven vehicle 3 to be charged and each of the charge control maps for the plurality of selection candidate chargers 4 so as to generate a charging profile for each selection candidate charger 4 (S35). The charger selection unit 118 refers to the respective charging profiles generated for the selection candidates and selects a charger 4 that can complete charging to the target SOC within a determined charging time as a recommended charger (S36). The charger guidance notification unit 119 notifies the electrically driven vehicle 3 or the operation management terminal device 7 that requested the search of guidance information for the selected recommended charger (S37).

There are some charging stations that have multiple chargers 4 connected to a single distribution board connected to the commercial power system 6. Also, some models have a single charger 4 with multiple charging ports. Hereafter, in the present specification, a charger 4 with multiple DC/DC converters 43 in parallel in the housing of one charger 4 and with multiple charging ports is also treated as multiple chargers 4.

Figure 9:
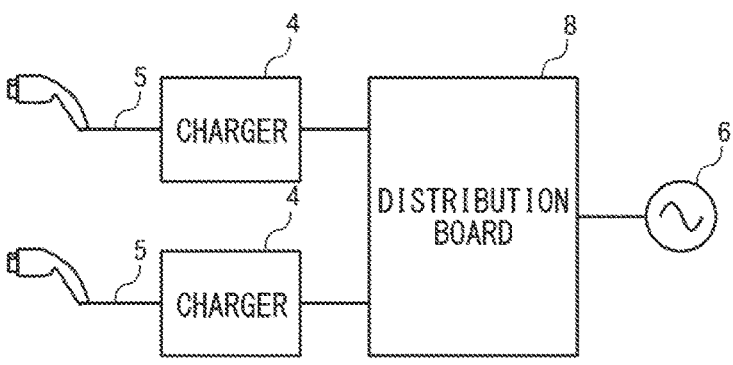
FIG. 9 is a diagram showing a configuration in which two chargers are connected to one distribution board.

FIG. 9 is a diagram showing a configuration in which two chargers 4 are connected to one distribution board 8. For example, a maximum of 30 A current can be drawn from the distribution board 8 when one charger 4 is used to charge one electrically driven vehicle 3 if the allowable current of a breaker in the distribution board 8 is 30 A. In contrast, the current that each charger 4 can draw from the distribution board 8 drops to a maximum of 15 A when two chargers 4 are used to charge two electrically driven vehicles 3 simultaneously.

Figure 10:
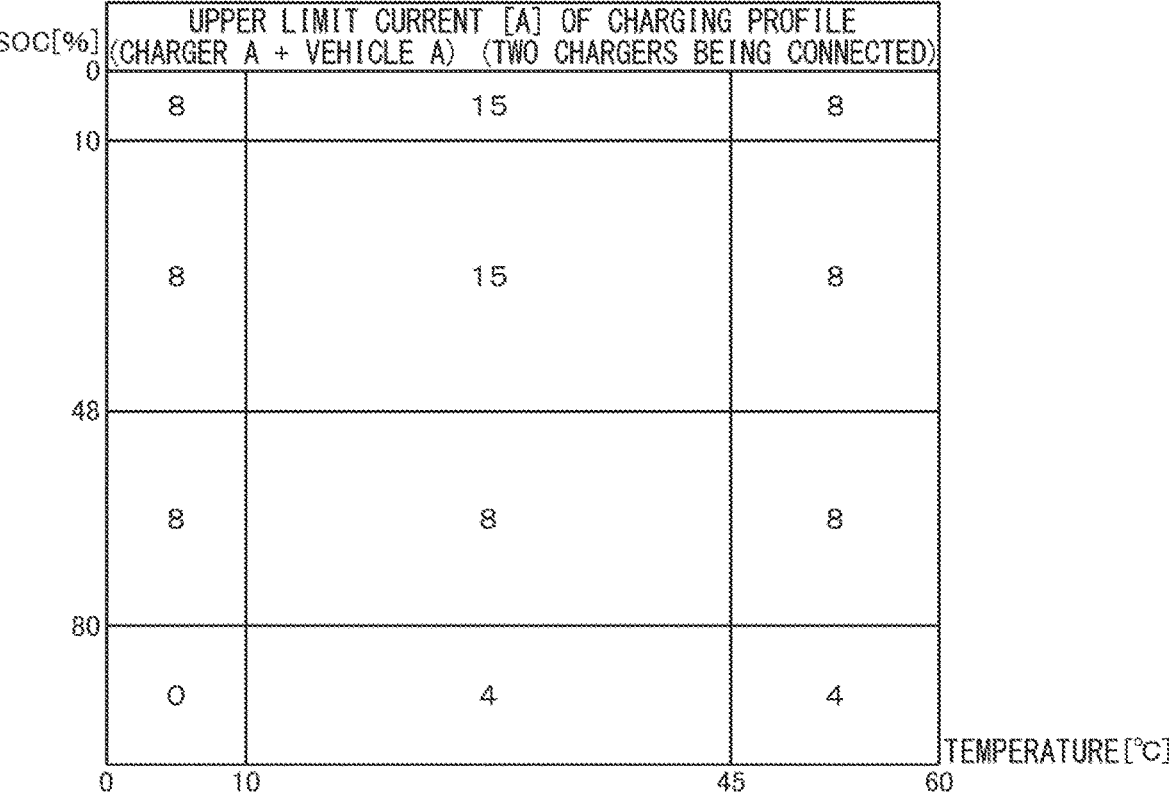
FIG. 10 is a diagram showing a charging profile obtained when the two chargers are connected that is generated based on the charge control map for the charger A and the charge control map for the electrically driven vehicle A shown in FIGS. 4A-4B.

FIG. 10 is a diagram showing a charging profile obtained when the two chargers are connected that is generated based on the charge control map for the charger A and the charge control map for the electrically driven vehicle A shown in FIGS. 4A-4B. The charging profile in FIG. 5 shows the charging profile obtained when one charger is connected. In the charging profile in FIG. 10, the upper current limit for the combination of an SOC in the range of 0 to 10% and a temperature in the range of 10 to 45° C. and the upper current limit for the combination of an SOC in the range of 10 to 48% and a temperature in the range of 10 to 45° C. are each limited to 15 [A].

The charging profile generation unit 117 generates a charging profile for each number of chargers to be used if at least two chargers 4 are connected to the commercial power system 6 via a single breaker. According to a predicted number of chargers to be used, the charger selection unit 118 switches the charging profile to be referred to for at least two chargers 4 connected to one breaker. That is, when selecting a recommended charger, the charger selection unit 118 uses the upper limit current according to the predicted number of chargers to be used for at least two chargers 4 connected to a single breaker.

For example, for practical use, the predicted number of chargers to be used during the daytime may be fixed to one, and the predicted number of chargers to be used during the nighttime may be fixed to two. The charger selection unit 118 may determine the predicted number of chargers to be used based on charging plans for multiple chargers 4 connected to one breaker if the charging plans can be acquired.

As explained above, according to the present embodiment, it is possible to appropriately select a charger 4 to be used for charging a specific electrically driven vehicle 3 from among a plurality of chargers 4. An electrically driven vehicle 3 cannot be charged as planned if a charger 4 cannot meet the current requirement of an electrically driven vehicle 3. In this regard, according to the present embodiment, selection of a charger 4 that does not limit the charging performance of the electrically driven vehicle 3 allows the electrically driven vehicle 3 to be charged as planned. Further, even if there is no charger 4 that can charge the electrically driven vehicle 3 as planned, a charger 4 that can achieve charging in a way close to the plan can be selected as an alternative.

Estimation of the charging performance of a charger 4 and the charging performance of an electrically driven vehicle 3 using a charging log and updating of the charge control map for the charger 4 and the charge control map for the electrically driven vehicle 3 allow for matching based on the actual charging performance. In contrast, when matching of a charger 4 and an electrically driven vehicle 3 is performed based on catalog specifications of the charger 4 and electrically driven vehicle 3, a charger 4 that cannot perform charging as required by the electrically driven vehicle 3 may be selected due to the discrepancy between the catalog specifications and the actual performance of the charger 4 and the deterioration of the charger 4. In this case, the charging time is longer than expected.

The detailed charge control of the charger 4 and electrically driven vehicle 3 is treated as a black box by each manufacturer, and it is difficult to identify the detailed charge control from catalog specifications. In contrast, the charge control of the charger 4 and electrically driven vehicle 3 can be estimated with high accuracy by learning the charge control of the charger 4 and electrically driven vehicle 3 from the charging log in the present embodiment.

The charging performance of a charger 4 also depends on the quality of power supplied from the commercial power system 6. Since charging logs obtained when the quality of the power from the commercial power system 6 is poor are also learned, the number of cases where charging cannot be performed as planned due to the influence of the commercial power system 6 can be reduced.

With the rapid spread of chargers 4 in the future, it is expected that inexpensive low-performance products will appear on the market. In addition, it is expected that the number of chargers 4 will increase that are no longer able to output power as shown in the specifications due to aging. Furthermore, the charging performance of electrically driven vehicles 3 is expected to improve as battery packs 31 mounted in the electrically driven vehicles 3 become larger in capacity and the number of vehicle models compatible with rapid charging increases. Thus, it is expected that the number of chargers 4 that cannot meet the requirements of electrically driven vehicles 3 will increase in the future.

In the present embodiment, the optimal matching of a charger 4 and an electrically driven vehicle 3 can be achieved by also considering the degradation of charging performance on the electrically driven vehicle 3 side. The charging performance of both can be utilized without excess or deficiency if a combination that can bring out the maximum performance of both can be extracted. This contributes to the efficient operation of all chargers 4 registered in the charger selection system 1.

In the present embodiment, the effects of individual differences in chargers 4 and the current limitation by a breaker between the chargers 4 and the commercial power system 6 can be taken into account, and more optimal matching of chargers 4 and electric vehicles 3 can thus be achieved.

Further, in the present embodiment, it is possible to select a charger 4 that can perform charging according to the planned charging time even when low-current charging is performed from the viewpoint of ensuring safety during charging and suppressing deterioration of the battery pack 31.

Described above is an explanation based on the embodiments of the present disclosure. The embodiments are intended to be illustrative only, and it will be obvious to those skilled in the art that various modifications to constituting elements and processes could be developed and that such modifications are also within the scope of the present disclosure.

In the above embodiment, the charge control map for a charger 4 and the charge control map for a charged electrically driven vehicle 3 are updated based on the charging log obtained from the charger 4. In this regard, only the charge control map for the charger 4 may be updated based on the charging log. That is, the charge control map for the electrically driven vehicle 3 may have a fixed value, e.g., a value that can be read from the catalog specifications.

Further, the charger 4 may also transmit to the charger selection system 1 the charging log of the electrically driven vehicle 3 that is not registered in the vehicle master holding unit 122. In that case, only the charge control map for the charger 4 is updated based on the charging log.

Four-wheeled electric vehicles are assumed as electrically driven vehicles 3 in the above embodiment. In this regard, electric motorcycles (electric scooters), electric bicycles, and electric kick scooters may also be used. Further, the electrically driven vehicles include not only full-standard electric vehicles but also low-speed electric vehicles such as golf carts and land cars used in shopping malls and entertainment facilities.

The embodiment may be specified by the following items.

Item 1

A charger selection system (1) including:
a first charge control map holding unit (123) that holds a charge control map for a plurality of chargers (4);

a second charge control map holding unit (124) that holds a charge control map for a plurality of electrically driven vehicles (3); and a charger selection unit (118) that selects a charger (4) used for charging any one electrically driven vehicle (3) of the plurality of electrically driven vehicles (3) from among the plurality of chargers (4), wherein a charge control map for a plurality of chargers (4) specifies the relationship between an upper limit current and charging conditions including at least one of the temperature of the chargers (4), the state of charge (SOC) of a secondary battery (31) mounted in an electrically driven vehicle (3) to be charged, the voltage of the secondary battery (31), and time, wherein a charge control map for the electrically driven vehicle (3) specifies the relationship between an upper limit current and charging conditions including at least one of the temperature of the secondary battery (31), the SOC of the secondary battery (31), the voltage of the secondary battery (31), and time, and wherein the charger selection unit (118) selects at least one charger (4) that least limits the charging performance of the electrically driven vehicle (3) to be charged.

This allows a charger (4) to be selected that can perform charging as planned according to the electrically driven vehicle (3).

Item 2

The charger selection system (1) according to Item 1, wherein the charge control map for the charger (4) specifies an upper limit current according to the temperature of the charger (4), an upper limit current according to the SOC or voltage of the secondary battery (31) mounted in the electrically driven vehicle (3) to be charged, or an upper limit current according to a combination of the temperature of the charger (4) and the SOC or voltage of the secondary battery (31), and wherein the charge control map for the electrically driven vehicle (3) specifies an upper limit current according to the temperature of the secondary battery (31), an upper limit current according to the SOC or voltage of the secondary battery (31), or an upper limit current according to a combination of the temperature of the secondary battery (31) and the SOC or voltage of the secondary battery (31).

This allows a charger (4) to be selected that can perform charging as planned according to the electrically driven vehicle (3).

Item 3

The charger selection system (1) according to Item 1 or 2, wherein the charger selection unit (118) selects a charger (4) that does not limit the charging performance of the electrically driven vehicle (3) under predicted conditions at the time of charging.

This can increase the probability that a charger (4) is selected that can perform charging as planned according to the electrically driven vehicle (3).

Item 4

The charger selection system (1) according to any one of Items 1 through 3, further including:

a charging log acquisition unit (113) that acquires a charging log from any one charger (4) of the plurality of chargers (4); and a charge control map updating unit (114) that updates a charge control map held in the first charge control map holding unit (123) based on the acquired charging log.

According to this, the actual state of the charging performance of the charger (4) can be reflected in the charge control map.

Item 5

The charger selection system (1) according to Item 4, wherein the charge control map updating unit (114) further updates a charge control map held in the second charge control map holding unit (124) based on the acquired charging log.

According to this, the actual state of the charging performance of the electrically driven vehicle (3) can be reflected in the charge control map.

Item 6

The charger selection system (1) according to any one of Items 1 through 5, further including:

a charging time determination unit (116) that determines a charging time based on information included in a search request for a charger (4), wherein the charger selection unit (118) selects a charger (4) that completes targeted charging within the determined charging time from among the plurality of chargers (4) when the charging time has been determined by the charging time determination unit (116).

This allows a charger (4) to be selected that can perform charging according to a charging plan even when the fastest charging is not performed.

Item 7

The charger selection system (1) according to any one of Items 1 through 6, wherein when at least two chargers (4) are connected to a power system (6) via one breaker (8), the charger selection unit (118) uses for the upper limit current of the at least two chargers (4) an upper limit current according to a predicted number of chargers to be used.

According to this, a connection mode between the chargers (4) and the power system (6) can be reflected in the charger (4) selection.

Item 8

A charger selection method including:

referring to a charge control map for a plurality of chargers (4) that specifies the relationship between an upper limit current and charging conditions including at least the temperature of the chargers (4) or at least one of the temperature of the chargers (4), the state of charge (SOC) of a secondary battery (31) mounted in an electrically driven vehicle (3) to be charged, the voltage of the secondary battery (31), and time and a charge control map for a plurality of electrically driven vehicles (3) that specifies the relationship between an upper limit current and charging conditions including at least one of the temperature of the secondary battery (31), the SOC of the secondary battery (31), the voltage of the secondary battery (31), and time so as to select a charger (4) used for charging any one electrically driven vehicle (3) of the plurality of electrically driven vehicles (3) from among the plurality of chargers (4); and selecting at least one charger (4) that least limits the charging performance of the electrically driven vehicle (3) to be charged in the selecting of a charger (4).

This allows a charger (4) to be selected that can perform charging as planned according to the electrically driven vehicle (3).

Item 9

A charger selection program comprising computer-implemented modules including:

a module that refers to a charge control map for a plurality of chargers (4) that specifies the relationship between an upper limit current and charging conditions including at least one of the temperature of the chargers (4), the state of charge (SOC) of a secondary battery (31) mounted in an electrically driven vehicle (3) to be charged, the voltage of the secondary battery (31), and time and a charge control map for a plurality of electrically driven vehicles (3) that specifies the relationship between an upper limit current and charging conditions including at least one of the temperature of the secondary battery (31), the SOC of the secondary battery (31), the voltage of the secondary battery (31), and time so as to select a charger (4) used for charging any one electrically driven vehicle (3) of the plurality of electrically driven vehicles (3) from among the plurality of chargers (4); and a module that selects at least one charger (4) that least limits the charging performance of the electrically driven vehicle (3) to be charged in the module that selects a charger (4).

This allows a charger (4) to be selected that can perform charging as planned according to the electrically driven vehicle (3).

INDUSTRIAL APPLICABILITY

The present disclosure is applicable to the selection of a charger for an electrically driven vehicle.

REFERENCE SIGNS LIST 1 charger selection system, 2 network, 3 electrically driven vehicle, 4 charger, 5 charging cable, 6 commercial power system, 7 operation management terminal device, 8 distribution board, 11 processing unit, 111 vehicle information acquisition unit, 112 charger information acquisition unit, 113 charging log acquisition unit, 114 charge control map updating unit, 115 charger search receiving unit, 116 charging time determination unit, 117 charging profile generating unit, 118 charger selection unit, 119 charger guidance notification unit, 12 memory unit, 121 charger master holding unit, 122 vehicle master holding, 123 charger charge control map holding unit, 124 vehicle charge control map holding unit, 31 battery pack, 32 battery control unit, 33 current sensor, 34 voltage sensor, 35 temperature sensor, 36 vehicle control unit, 37 motor, 38 inverter, 39 first relay, 310 second relay, 311 on-board charger, 312 GPS sensor, 313 vehicle speed sensor, 314 wireless communication unit, 315 antenna, 41 rectifier circuit, 42 PFC circuit, 43 DC/DC converter, 44 control unit, 45 current sensor, 46 voltage sensor, 47 temperature sensor

The invention claimed is:

1. A charger selection system comprising:

a first charge control map holding unit that holds a plurality of first charge control maps respectively associated with a plurality of chargers;

a second charge control map holding unit that holds a plurality of second charge control maps respectively associated with a plurality of electrically driven vehicles each having a secondary battery mounted thereon; and a charger selection unit that selects a charger used for charging any one electrically driven vehicle of the plurality of electrically driven vehicles from among the plurality of chargers, wherein each of the first charge control maps specifies a first upper limit current for a corresponding one of the plurality of chargers to charge the secondary battery, the first upper limit current dependent on one or more of a temperature of the charger, a state of charge (SOC) of the secondary battery, a voltage of the secondary battery, and time, wherein each of the second charge control maps specifies a second upper limit current for charging the secondary battery of a corresponding one of the plurality of electrically driven vehicles, the second upper limit current dependent on one or more of a temperature of the secondary battery, the SOC of the secondary battery, the voltage of the secondary battery, and time, and wherein the charger selection unit selects, by referring to one or more of the first charge control maps and one of the second charge control maps corresponding to an electrically driven vehicle to be charged, at least one charger that least limits the charging performance of the electrically driven vehicle to be charged from among the plurality of chargers, wherein the system further comprises:

a charging log acquisition unit that acquires a charging log from any one charger of the plurality of chargers; and a charge control map updating unit that updates a first charge control map associated with the any one charger based on the acquired charging log.

2. The charger selection system according to claim 1, wherein the first charge control map specifies the first upper limit current according to the temperature of the charger, according to the SOC or voltage of the secondary battery mounted in the electrically driven vehicle to be charged, or according to a combination of the temperature of the charger and the SOC or voltage of the secondary battery, and wherein the second charge control map specifies the second upper limit current according to the temperature of the secondary battery, according to the SOC or voltage of the secondary battery, or according to a combination of the temperature of the secondary battery and the SOC or voltage of the secondary battery.

3. The charger selection system according to claim 1, wherein the charger selection unit selects a charger that does not limit the charging performance of the electrically driven vehicle under predicted conditions at the time of charging.

4. The charger selection system according to claim 1, wherein the charge control map updating unit further updates a second charge control map associated with an electrically driven vehicle charged by the any one charger based on the acquired charging log.

5. The charger selection system according to claim 1, further including:

a charging time determination unit that determines a charging time based on information included in a search request for a charger, wherein the charger selection unit selects a charger that completes targeted charging within the determined charging time from among the plurality of chargers when the charging time has been determined by the charging time determination unit.

6. The charger selection system according to claim 1, wherein when two or more chargers are connected to a power system via one breaker, the charger selection unit uses for the upper limit current of the two or more chargers an upper limit current according to a predicted number of chargers to be used.

7. A charger selection method comprising:

providing a plurality of first charge control maps respectively associated with a plurality of chargers, and providing a plurality of second charge control maps respectively associated with a plurality of electrically driven vehicles each having a secondary battery mounted thereon, wherein each of the first charge control maps specifies a first upper limit current for a corresponding one of the plurality of chargers to charge the secondary battery, the first upper limit current dependent on one or more of a temperature of the charger, a state of charge (SOC) of the secondary battery, a voltage of the secondary battery, and time, wherein each of the second charge control maps specifies a second upper limit current for charging the secondary battery of a corresponding one of the plurality of electrically driven vehicles, the second upper limit current dependent on one or more of a temperature of the secondary battery, the SOC of the secondary battery, the voltage of the secondary battery, and time, and selecting, by referring to one or more of the first charge control maps and one of the second charge control maps corresponding to an electrically driven vehicle to be charged, at least one charger that least limits the charging performance of the electrically driven vehicle to be charged from among the plurality of chargers, wherein the method further comprises:

acquiring a charging log from any one charger of the plurality of chargers; and updating a first charge control map associated with the any one charger based on the acquired charging log.

8. A non-transitory computer-readable recording medium having embodied thereon a charger selection program, the charger selection program causing a computer to execute:

referring to one or more of a plurality of first charge control maps respectively associated with a plurality of chargers, and referring to one or more of a plurality of second charge control maps respectively associated with a plurality of electrically driven vehicles each having a secondary battery mounted thereon, wherein each of the first charge control maps specifies a first upper limit current for a corresponding one of the plurality of chargers to charge the secondary battery, the first upper limit current dependent on one or more of a temperature of the charger, a state of charge (SOC) of the secondary battery, a voltage of the secondary battery, and time, wherein each of the second charge control maps specifies a second upper limit current for charging the secondary battery of a corresponding one of the plurality of electrically driven vehicles, the second upper limit current dependent on one or more of a temperature of the secondary battery, the SOC of the secondary battery, the voltage of the secondary battery, and time, and selecting, by referring to one or more of the first charge control maps and one of the second charge control maps corresponding to an electrically driven vehicle to be charged, at least one charger that least limits the charging performance of the electrically driven vehicle to be charged from among the plurality of chargers, wherein the charger selection program causes the computer to further execute:

acquiring a charging log from any one charger of the plurality of chargers; and updating a first charge control map associated with the any one charger based on the acquired charging log.

9. The charger selection method according to claim 7, further comprising:

updating a second charge control map associated with an electrically driven vehicle charged by the any one charger based on the acquired charging log.

10. The non-transitory computer-readable recording medium according to claim 8, wherein the charger selection program causes the computer to further execute:

updating a second charge control map associated with an electrically driven vehicle charged by the any one charger based on the acquired charging log.

* * * * *